United States Patent [19]

Hetherington et al.

[11] 4,007,335
[45] Feb. 8, 1977

[54] TELEPHONE LINE BATTERY FEED CIRCUIT

[75] Inventors: Irvine Keers Hetherington, St. Charles; DeWitt Paul Smith, Naperville, both of Ill.

[73] Assignee: Bell Telephone Laboratories, Incorporated, Murray Hill, N.J.

[22] Filed: Nov. 12, 1975

[21] Appl. No.: 631,086

[52] U.S. Cl. .................. 179/16 AA; 179/18 FA
[51] Int. Cl.² ........................... H04M 1/76
[58] Field of Search ......... 179/16 A, 16 AA, 18 F, 179/18 FA, 23, 81 R, 81 B, 16 F

[56] References Cited
UNITED STATES PATENTS

| | | | |
|---|---|---|---|
| 3,035,122 | 5/1962 | Livingstone | 179/18 FA |
| 3,594,510 | 7/1971 | Blashfield | 179/16 AA |
| 3,748,395 | 7/1973 | Herter | 179/18 FA |
| 3,808,377 | 4/1974 | Young | 179/18 FA |
| 3,916,110 | 10/1975 | Lee et al. | 179/16 F |

*Primary Examiner*—Kathleen H. Claffy
*Assistant Examiner*—Randall P. Myers
*Attorney, Agent, or Firm*—John C. Albrecht

[57] ABSTRACT

A telephone line battery feed circuit for supplying talking current to a subscriber subset and at the same time reducing common mode interference signals. The inputs of a differential operational amplifier are coupled to a telephone line and the outputs of the differential operational amplifier are coupled to a battery feed circuit. The battery feed circuit provides talking current to the subscriber subset and the differential operational amplifier presents a high impedance between the battery and the telephone line to differential voice signals while at the same time presenting a low impedance between the telephone line and the battery for common mode interference signals thereby reducing the latter.

11 Claims, 1 Drawing Figure

TELEPHONE LINE BATTERY FEED CIRCUIT

BACKGROUND OF THE INVENTION

This invention relates to telephone line circuits and to battery feed circuits for such telephone lines.

In a telephone subscriber loop comprising a telephone line a subscriber subset and central office circuits it is necessary to supply a dc voltage in order to provide talking current. It is also necessary to provide some means of reducing noise signals which are induced onto the telephone line and are characteristically common mode signals in contrast to the differential mode talking signals. Prior battery feed, common mode interference reduction circuits comprise one large inductor with two windings, one connected from a first wire of the telephone line to ground and one connected from a second wire of the telephone line to battery. The two windings are closely coupled whereby a high impedance is presented to differential signals and a low impedance to longitudinal signals. Although the inductor is relatively inexpensive it is physically bulky and therefore results in large secondary costs in the area of packaging. It is desirable to implement a telephone line battery feed circuit using integrated or discrete circuit technology rather than the prior discrete inductor.

SUMMARY OF THE INVENTION

In accordance with this invention a telephone line battery feed circuit accomplishes the reduction of common mode signals while supplying talking current to the subscriber subset utilizing only integrated circuit components. A coupling circuit couples a power supply to the telephone line whereby talking current is provided in the telephone line loop circuit. A differential operational amplifier comprises two inputs, ac coupled to respective lines of the telephone circuit and outputs connected to the coupling circuit whereby a high impedance from line to power supply is presented to differential mode signals appearing on the telephone line wires which are therefore transmitted without attenuation but a low impedance is presented to common mode signals on the telephone line wires which are therefore attenuated.

BRIEF DESCRIPTION OF THE DRAWING

A telephone line battery feed circuit according to this invention will be better understood from a consideration of the detailed description of the organization and operation of one illustrative embodiment thereof which follows when taken in conjunction with the accompanying drawing in which.

DETAILED DESCRIPTION

Figure 1:
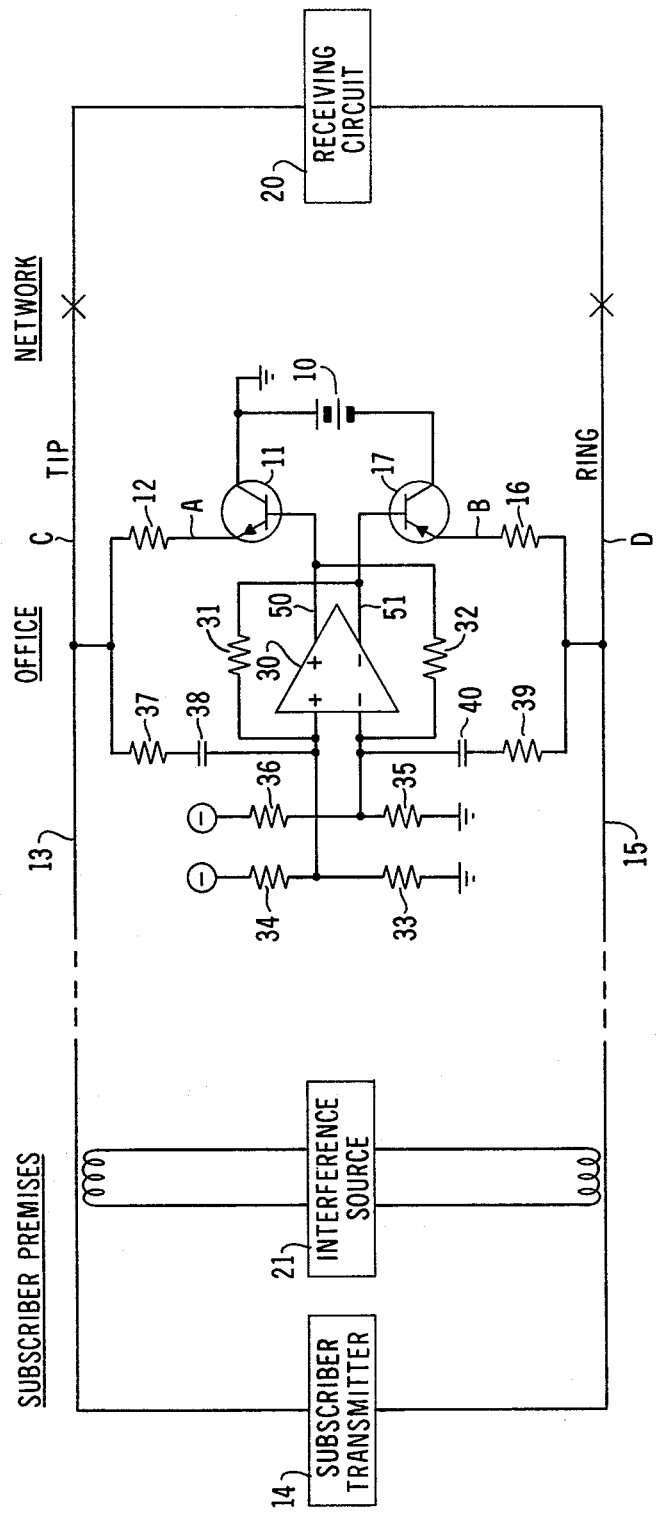
FIG. 1 is a circuit diagram of a telephone line battery feed circuit.

In the illustrative line battery feed circuit of FIG. 1 the path for the subscriber loop current comprises the following serially connected elements: the positive grounded terminal of a battery 10, a transistor 11, a resistor 12, a transmission line 13, a subscriber set 14, a transmission line 15, a resistor 16, a transistor 17, and the negative terminal of battery 10. Acoustic signals applied to the transmitter of the subscriber set 14 produce corresponding changes in the resistance of the transmitter element and, therefore, cause corresponding changes in the current flowing through the transmitter and therefore in the voltage across the two terminals of the transmitter 14. As shown in FIG. 1 a receiving circuit 20 is connected in parallel with the transmitter of the subscriber set 14 by way of transmission wires 13, 15. Accordingly, variations in voltage across the transmitter of the subscriber set 14 cause corresponding acoustic signals at receiving circuit 20.

An interference source 21 is coupled in such a way that it appears as a current source on wires 13 and 15 of the transmission line.

A number of different receiving circuits may be connected in the circuit of FIG. 1 some being balanced and therefore relatively insensitive to common mode interference signals and some being unbalanced and therefore relatively sensitive to common mode signals. An example of an unbalanced receiving circuit is a dial pulse receiver whose pulse detector is connected only to the ring wire of the two-wire transmission path. The pulse detector detects the making and breaking of a dial pulse transmitter in the subscriber subset by sensing voltage differences on the ring wire due to the presence or absence of loop current. If a large common mode interference signal is present the detector would falsely indicate make and break conditions according to the frequency of the common mode interference signal.

Since interference source 21 acts like a current source it will generate a large voltage signal if it is connected to a high impedance receiving circuit and there is no low impedance path to battery associated therewith. Even assuming a receiving circuit which is insensitive to common mode signals, for example a transformer coupling, if there is no low impedance path to battery the high voltage signal generated by interference source 21 will tend to create interference through other means, for example, by exceeding the interwinding breakdown voltage of such a transformer. Although a line is designed to be balanced, any of a number of factors, such as the tolerance of components utilized, can result in a degree of unbalance which can result in common mode interference signals being transformed into differential mode interference signals. As a result, it is desirable to provide a low impedance path to battery for common mode signals regardless of whether the receiving circuit connected through the network is inherently sensitive or insensitive to common mode signals.

The operation of the circuit of FIG. 1 must be considered with respect to: the supply of dc talking battery for the subscriber set 14 and the suppression of common mode noise signals by the isolation of the battery supply 10 from the transmission wires 13 and 15 with respect to differential mode signals such as are generated by the application of voice to the transmitter of the subscriber set 14. The operation of the circuit of FIG. 1 will be considered with respect to common mode and differential mode signals on an individual basis, however, signals which result on the line in these cases are additive.

As previously indicated the serial path for the supply of talking battery from the potential source 10 to the subscriber set 14 includes the transistors 11 and 17. As shown in FIG. 1 the transistor 11 is a NPN transistor with the emitter connected to the resistor 12 which in turn is connected to the line 13, and the transistor 17 is a PNP transistor having the emitter connected to the resistor 16 which is in turn connected to the wire 15. The transistors 11 and 17 are operated in the active or linear range and typically provide a voltage drop between emitter and collector.

The battery supply circuit of FIG. 1 is arranged to suppress common mode signals such as are induced into wires 13 and 15 by an interference source 21 and to permit differential mode signals to be transmitted from the subscriber set 14 to the receiving circuit 20 without substantial attenuation.

In order to understand the operation of the circuit of FIG. 1 with respect to differential and common mode signals the operation of the differential amplifier 30 and the feedback circuitry must be understood. It is an inherent characteristic of differential amplifier 30 that the application of substantially identical signals (such signals are characteristic of common mode noise signals) to the plus and minus input terminals of the differential amplifier 30 results in no change in potential at the output terminals 50 and 51. Accordingly, in the presence of common mode signals, the operation of the differential amplifier 30 is such that there are no resulting variations at the points marked A and B in FIG. 1. Therefore, these points, which are respectively coupled by the resistors 12 and 16, present a relatively low impedance path between the wires 13 and 15 and the terminals of the battery 10.

The differential amplifier 30, in the absence of the feedback resistors 31 and 32, will provide a very large gain between the respective input terminals and output terminals. That is, in the absence of the resistors 31 and 32, a signal applied to the plus terminal will appear as a very large signal at the plus output terminal 50 and a corresponding differential mode signal applied to the minus terminal will appear as a very large signal at the negative output terminal 51. In the circuit of FIG. 1, including the feedback resistors 12 and 16 the gains of the two paths through the differential amplifier 30 are determined by the ratio of the value of the feedback resistor, e.g., resistor 31 and the input coupling resistor, e.g., resistor 37. Similarly the gain from the negative input terminal to the negative output terminal of the differential amplifier is determined by the values of the resistors 32 and 39. In the illustrative example of FIG. 1 these ratios are chosen such that in the presence of differential mode signals the gain of each of the two legs is approximately unity.

Accordingly, in the case of differential mode signals (such as are characteristic of voice or other intelligence) the output terminals 50 and 51 of differential amplifier 30 will track the signals on wires 13 and 15 which are respectively coupled to the plus and minus terminals of the amplifier 30. Since the signals at the terminals 50 and 51 control the current flow through the transistors 11 and 17 the potentials at the points A and B will similarly track the input signals. Since the potentials at the points marked A and B track, on a substantially one for one basis, the potentials at the points C and D, there is no shunting of the differential mode signals by the talking battery supply circuit of FIG. 1.

In the case of common mode signals such as are generated by interference source 21, differential amplifier 30 will be unresponsive and therefore output terminals 50 and 51 will be unresponsive. Resistors 12 and 16 will appear to be connected to battery 10 and therefore will provide a low impedance path to battery 10 for common mode signals. Since the path provided by resistors 12 and 16 is a considerably lower impedance path than that presented by receiving circuit 20, the current source signal presented by interference source 21 will be substantially shunted to battery as is desired.

What has been described is considered to be only a specific illustrative embodiment of the invention and it is to be understood that various other arrangements may be devised by one skilled in the art without departing from the spirit and scope thereof as defined by the accompanying claims.

What is claimed is:

1. A circuit for supplying talking current from a power supply for a two-wire transmission path and for reducing undesirable common mode signals thereon comprising:
    a first and a second controllable coupling means each comprising input, output, and control terminals for coupling said power supply to said transmission path; and
    differential operational amplifier means comprising:
        a first and a second input a.c. coupled to said transmission path;
        a first and a second output respectively connected to said control terminals of said first and second coupling means; and
        means for generating signals at said outputs corresponding to signals present at said inputs
    whereby said coupling means present a high impedance from said transmission path to said power supply for differential mode signals and a low impedance from said transmission path to said power supply for common mode signals thereby substantially reducing the latter.

2. A circuit for supplying talking current for a two-wire communication transmission path and for reducing undesirable common mode signals thereon according to claim 1 wherein said first and second inputs of said differential operational amplifier means are each a.c. coupled to said transmission path by means of a resistor and a capacitor connected in series.

3. A circuit for supplying talking current for a two-wire communication transmission path and for reducing undesirable common mode signals thereon according to claim 1 wherein said differential operational amplifier means further comprises:
    a first and second input and a first and second output connected respectively to said first and second inputs and said first and second outputs of said means for reducing common mode signals;
    amplification means;
    a first feedback resistor connected between said first input and said second output;
    a second feedback resistor connected between said second input and said first output;
    a first d.c. biasing network connected to said first input; and
    a second d.c. biasing network connected to said second input.

4. A circuit for supplying talking current for a two-wire communication transmission path and for reducing undesirable common mode signals thereon according to claim 1 wherein said power supply means comprises a battery.

5. A circuit for supplying talking current for a two-wire communication transmission path and for reducing undesirable common mode signals thereon according to claim 1 wherein said first coupling means comprises a first transistor comprising:
    a base terminal connected to said first output of said differential operational amplifier means;

a collector terminal connected to a first terminal of said power supply;
an emitter terminal; and
a first resistor connected between said emitter terminal and a first wire of said two-wire transmission path; and said second output coupling means comprises a second transistor comprising:
a base terminal connected to said second output of said differential operational amplifier means;
a collector terminal connected to a second terminal of said power supply; and
an emitter terminal; and
a second resistor connected between said emitter terminal and a second wire of said two-wire transmission path.

6. A battery feed circuit adapted to be connected to a two-wire transmission line and for reducing common mode signals on such lines comprising first and second transmission wires and serving a subscriber's transmitter for generating differential mode signals on said transmission wires and a receiving circuit for receiving differential mode signals, the battery feed circuit comprising:
first and second terminals for connection to said transmission wires;
a source of battery potential having positive and negative terminals;
first and second controllable variable conductance means electrically coupling said battery terminals to said first and second terminals; and
means comprising first and second inputs a.c. coupled, respectively, to said first and second terminals and said means being responsive to signals occurring at said first and second terminals for correspondingly controlling the conductances of said first and second variable conductance means.

7. A circuit for reducing common mode signals on a two-wire transmission path comprising:
a battery comprising battery and ground terminals;
a first low impedance path comprising:
a first terminal connected to a first wire of said two-wire transmission path;
a second terminal connected to said ground terminal; and
a low impedance element connected between said first terminal and said second terminal;
a second low impedance path comprising:
a third terminal connected to a second wire of said two-wire transmission path;
a fourth terminal connected to said battery terminal;
a second low impedance element connected between said third terminal and said fourth terminal; and
a differential operational amplifier comprising:
a first input a.c. coupled to said first wire;
a second input a.c. coupled to said second wire;
a first output connected to said second terminal of said first low impedance path;
a second output connected to said fourth terminal of said second low impedance path; and
amplification means for generating at said first and second outputs signals corresponding to signals present on said two-wire transmission path whereby common mode signals present on said two-wire transmission path are effectively shunted to said battery and said ground terminals but differential mode signals present on said two-wire transmission path cause said amplification means to generate signals at said second and fourth terminals which signals make the impedance from said first and third terminals to ground and battery respectively appear to be relatively high.

8. A battery feed circuit for reducing common mode signals present on a transmission path comprising:
differential operational amplifier means comprising:
a positive input;
a negative input;
a positive output;
a negative output;
means for generating a signal at said positive output corresponding to the signal present on said positive input minus the signal present on said negative input and for generating a signal on said negative output corresponding to the negative of the signal present on said positive output;
a first input resistor and a first input capacitor connected in series between a first wire of said transmission path and said positive input of said differential operational amplifier means;
a second input resistor and a second input capacitor connected in series between a second wire of said transmission path and said negative input of said differential operational amplifier means;
biasing means connected to said positive and to said negative inputs of said differential operational amplifier means for defining predetermined d.c. outputs of said differential operational amplifier;
a first feedback resistor connected between said negative output and said positive input of said differential operational amplifier means;
a second feedback resistor connected between said positive output and said negative input of said differential operational amplifier means;
a first output transistor comprising:
a base input connected to said positive output of said differential operational amplifier means;
a collector connected to ground;
an emitter connected through a first output resistor to said first wire of said transmission path; and
a second output transistor comprising:
a base input connected to said negative output of said differential operational amplifier means;
a collector connected to a negative voltage source; and
an emitter connected through a second output resistor to said second wire of said transmission path.

9. A circuit for reducing common mode signals on a two-wire transmission path comprising:
a battery;
a first coupling circuit for coupling a first terminal of said battery to a first wire of said two-wire transmission path comprising:
a first transistor and a first resistor connected in series;
a second coupling circuit for coupling a second terminal of said battery to a second wire of said two-wire transmission path comprising:
a second transistor and a second resistor connected in series; and
means comprising first and second inputs a.c. coupled, respectively, to said transmission wires for controlling correspondingly said first and said second transistors to vary the potentials applied, respectively, to said first and said second resistors to correspond to the signals present on said transmission path.

10. A circuit for reducing common mode signals on a two-wire transmission path according to claim 9 wherein said last mentioned means comprises a differential operational amplifier circuit.

11. A circuit for reducing common mode signals on a two-wire transmission path according to claim 10 wherein said differential operational amplifier circuit comprises:
- a differential operational amplifier having a first input a.c. coupled to said first wire;
- a first output connected to said first transistor;
- a second input a.c. coupled to said second wire;
- a second output connected to said second transistor; and
- feedback resistors connecting said first output to said second input and said second output to said first input.

* * * * *